United States Patent [19]

Johnston et al.

[11] Patent Number: 5,733,964
[45] Date of Patent: Mar. 31, 1998

[54] SURFACTANTS FOR HETEROGENEOUS PROCESSES IN LIQUID OR SUPERCRITICAL $CO_2$

[75] Inventors: Keith P. Johnston, Austin, Tex.; Steven Paul Wilkinson, Coopersburg, Pa.; Mark Leonard O'Neill, Austin, Tex.; Lloyd Mahlon Robeson, Macungie, Pa.; Simon Mawson, Austin, Tex.; Richard Henry Bott, Macungie; Carrington Duane Smith, Quakertown, both of Pa.

[73] Assignees: Board of Regents, The University of Texas System, Austin, Tex.; Air Products and Chemicals, Inc., Allentown, Pa.

[21] Appl. No.: 667,132

[22] Filed: Jun. 20, 1996

[51] Int. Cl.⁶ .................................................. C08L 53/00
[52] U.S. Cl. .................. 524/505; 524/245; 524/377; 524/401; 524/502; 525/88; 525/92; 525/93
[58] Field of Search .................................. 524/245, 377, 524/502, 401, 205; 525/88, 92, 93

[56] References Cited

U.S. PATENT DOCUMENTS

| | | | |
|---|---|---|---|
| 3,522,228 | 7/1970 | Fukui et al. | 260/94.9 |
| 4,166,150 | 8/1979 | Mattor et al. | 428/352 |
| 4,282,054 | 8/1981 | Mattoe et al. | 156/289 |
| 4,719,194 | 1/1988 | Cietek et al. | 502/155 |
| 4,748,220 | 5/1988 | Hartmann et al. | 526/89 |
| 5,312,882 | 5/1994 | DeSimone et al. | 526/201 |
| 5,328,972 | 7/1994 | Dada et al. | 526/227 |
| 5,382,623 | 1/1995 | DeSimone et al. | 526/201 X |
| 5,451,633 | 9/1995 | DeSimone et al. | 524/731 |
| 5,506,317 | 4/1996 | DeSimone et al. | 526/201 |
| 5,589,105 | 12/1996 | DeSimone et al. | 252/351 |

FOREIGN PATENT DOCUMENTS 0301532   2/1989   European Pat. Off. .

OTHER PUBLICATIONS

DeSimone, J. M., et al. "Synthesis of Fluoropolymers in Supercritical Carbon Dioxide." *Science*. vol. 257. p. 945: 14 Aug. 1992.

DeSimone, J. M. et al. "Dispersion Polymerizations in Supercritical Carbon Dioxide." *Science*. vol. 265. p. 356: 15 Jul. 1994.

O,Neill, M. L. et al. "Polymer Stabilized Emulsions in Supercritical Carbon Dioxide." Proceedings of the American Chemical Society, Division of Polymeric Material: Science and Engineering, p. 228 (1996).

*Primary Examiner*—Judy M. Reddick
*Attorney, Agent, or Firm*—Polster, Lieder, Woodruff & Lucchesi, L.C.

[57] ABSTRACT

Heterogeneous polymer mixtures comprising a polymer in liquid or supercritical $CO_2$ are stabilized by employing a poly(propylene oxide) or poly(butylene oxide) based surfactant. These surfactants are especially well suited for stabilizing heterogeneous polymer mixtures formed by micronizing techniques as well as by precipitation of a compressed fluid antisolvent applications.

9 Claims, 3 Drawing Sheets

- POLY FOA, 3500 psi, 40°C
- PLURONIC 17R2, 4500 psi, 40°C
- W/O SURFACTANT, 4500 psi, 40°C

• PLURONIC 17R2; 1500 psi, 25°C
■ NO SURFACTANT; 1500 psi, 25°C

SURFACTANTS FOR HETEROGENEOUS PROCESSES IN LIQUID OR SUPERCRITICAL CO₂

TECHNICAL FIELD OF THE INVENTION

The present invention relates to heterogeneous processes carried out in liquid or supercritical $CO_2$ using surfactants to stablize emulsions, dispersions or suspensions.

BACKGROUND OF THE INVENTION

Heterogeneous polymer mixtures, such as styrene-butadiene, vinyl acetate and acrylate based emulsions are commonly employed in various applications. These include film packaging, carpet backing, pressure-sensitive adhesives, furniture construction, vinyl laminating, and food packaging. A stable polymeric emulsion, or latex, is an important factor for the successful development of these applications.

Typically, polymeric emulsions are water based, this provides an "environmentally benign" media for creating polymeric films. Major drawbacks for using aqueous media are related to the initiators and surfactants utilized to prepare water based emulsions, which typically impart poor water resistant properties to the resultant films. Developing an 'environmentally benign' non-polar media to stabilize these heterogeneous mixtures could result in significant improvements in the water resistance of the polymeric films.

Both ionic and non-polar surfactants have frequently been employed in the stabilization of water based emulsions. These 'surface active' agents (surfactants) help prevent the colloid particles that form the emulsion from agglomerating. The mechanisms proposed to describe this phenomena depend on the surfactant type. Ionic surfactants are believed to stabilize the colloid particles through ionic interactions with the "ionic double layer" that exists around the particle's surface. Non-polar (generally, polymeric) surfactants are employed to form the emulsions, a 'steric' mechanism is typically used to describe the emulsion stabilization phenomena.

One suitable non-polar media that meets the environmentally benign requirements is carbon dioxide, see DeSimone et al (Science 257:945 (1992). Recently DeSimone has reported the use of supercritical carbon dioxide as an inexpensive, non-toxic, non-flammable, inert media for performing heterogeneous polymerizations of acrylates (Science 265:356 (1994)). DeSimone, et al. U.S. Pat. Nos. 5,312,882 and 5,382,623 describe the use of fluorocarbons and siloxane based surfactants to stabilize the growing polymer particles in dispersion polymerizations of acrylates. These references were the first to describe the incorporation of surfactants into the polymerization process using $CO_2$ as the polymerization media. Previous attempts at polymerizing and forming stable heterogeneous mixtures in $CO_2$, such as Fukui, et al. (U.S. Pat. No. 3,522,228), Hartmann, et al. (U.S. Pat. No. 4,748,220), Dada, et al. (U.S. Pat. No. 5,328,972) and European Patent application EPO 301532 did not employ surfactants and precipitation polymerizations occurred.

Specific techniques which result in heterogeneous polymeric mixtures in liquid or supercritical $CO_2$ include emulsifying or "micronizing" as taught by M. L. O'Neill, et al "Polymer Stabilized Emulsions in Supercritical Carbon Dioxide", proceedings of the American Chemical Society, Division of Polymeric Material: Science & Engineering, p. 228 (1996); precipitation from compressed fluid antisolvents (PCA) as taught by D. J. Dixon, et al, "Polymeric Materials Formed by Precipitation with a Compressed Fluid Antisolvent" AIChE, 39, 127 (1993); and by emulsion polymerization.

Successful surfactants for polymerizing in a carbon dioxide media must be composed of a $CO_2$ philic moiety and a $CO_2$ phobic moiety. DeSimone et al describe the use of fluorocarbons and siloxanes as the $CO_2$-philic group required for successful surface active behavior in $CO_2$. The chemical and physical requirements for a $CO_2$-philic group generally fall into three categories (1). difficult to polarize, (2) low solubility parameter, and (3) electron donating. Fluorocarbons and siloxanes fit these requirements, the most successful surfactant for $CO_2$ to date, has been the poly (fluoro octyl acrylate); or poly FOA.

It is an object of this present invention to find a cost effective $CO_2$-philic chemical group that imparts $CO_2$-philic character to a surfactant to help stabilize polymeric emulsions, dispersions and suspensions in liquid or supercritical $CO_2$.

SUMMARY OF THE INVENTION

The present invention involves the use of poly(propylene oxide) and poly(butylene oxide) based surfactants for stabilizing heterogenous mixtures of polymeric materials and liquid or supercritical carbon dioxide. These surfactants are especially well suited for stabilizing heterogeneous polymer mixtures formed by micronizing techniques as well as by the precipitation from compressed fluid antisolvent (PCA) applications.

DETAILED DESCRIPTION OF THE INVENTION

Figure 1:
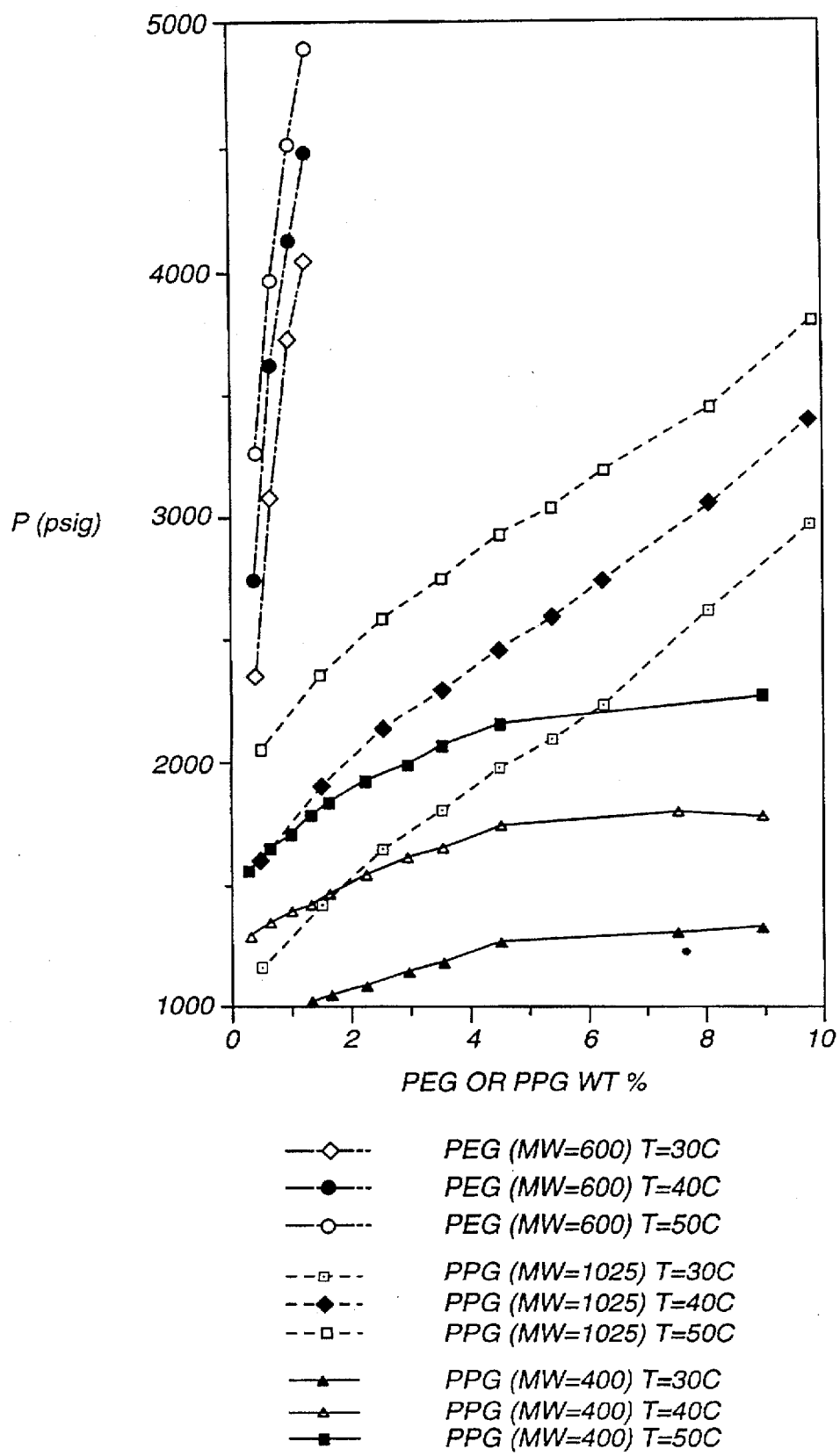
FIG. 1 is a plot showing the solubility of propylene oxide and ethylene oxide of different molecular weights in $CO_2$.

We have found that poly(propylene oxide) and poly (butylene oxide) based surfactants can be used to stabilize heterogeneous polymeric mixtures formed in a carbon dioxide media. The surfactants referred to herein can be represented by the structural formula:

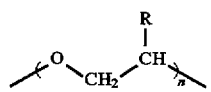

where:

R=H -poly(ethylene oxide) (PEO)

R=CH₃ -poly(propylene oxide) (PPO)

R=CH₂CH₃ -poly(butylene oxide) (PBO)

n is from 2 to about 1,000.

These structures are also known commonly as poly(glycol)s or poly(1,2-epoxide)s.

The heterogeneous polymeric mixture, ie, emulsion, suspension or dispersion can be generated by 'micronizing' a mixture of the polymer and liquid or supercritical carbon dioxide. Carbon dioxide can be compressed to liquid like densities and/or heated above its critical temperature to form a supercritical fluid. By pumping the $CO_2$/polymer mixture through a capillary tube, the mixture undergoes high shear forces that break up the mixture and a dispersion is formed (ie, "micronizing"). Without surfactant addition, agitation and continuous pumping are required to prevent the heterogeneous mixture from aggregating. Alternatively, these surfactants can be used in precipitation compressed fluid antisolvent (PCA) processes to allow for the formation of discrete particles.

Additionally, although initial attempts have been unsuccessful, it is believed that the surfactants, under the proper conditions, could be used to stabilize heterogeneous mixtures prepared via free radical polymerization using carbon dioxide as the reaction media. Upon addition of an appropriate initiator, the monomers chains extend and form higher molecular weight compounds. These polymeric compounds are generally insoluble in $CO_2$ and precipitate out of the $CO_2$ media to form an agglomerated mass if they are not properly stabilized by a surfactant. The details of such free radical heterogeneous polymerizations are noted in U.S. Pat. No. 5,312,882 and U.S. Pat. No. 5,382,623 to DeSimone et al.

The present invention is applicable to a wide variety of polymeric materials that include, but are not limited to, polymers and copolymers of acrylates, styrenics, vinyl esters and olefins.

An important factor relating to heterogeneous mixture stability is the stabilizing power of the surfactant. See Piirma, "Polymeric Surfactants" in "Emulsion Polymerization" (Academic Press, New York 1982). The majority of the prior art related to surfactants utilizes water soluble surfactants in aqueous media. The existing prior art for $CO_2$, states that only fluorocarbons and siloxanes can be used as surfactants for stabilizing $CO_2$ based heterogeneous mixtures. We have now found, however, that surfactants containing a PPO or a PBO moiety can stabilize $CO_2$ based heterogeneous mixtures. The large variety of PPO and PBO based surfactants that exist commercially which vary in their polymer topology (architecture) and polymer composition (copolymer ratio's) provides an excellent means to tailor a specific surfactant to an individual polymer mixture. The surfactants of this invention may be reactive or non-reactive and can also be "ionic" or non-ionic. Typical examples of suitable non-ionic surfactants for use in this invention are the Pluronic and Tetronic series of PPO/PEO copolymers, available as triblocks or as tetrafunctional polymers from BASF. Examples of surfactants available under the Pluronic tradename include:

Pluronic L Series

HO(CH₂CH₂O)ₙ(CH₂CHO)ₙ(CH₂CH₂O)ₙH
           |
           CH₃

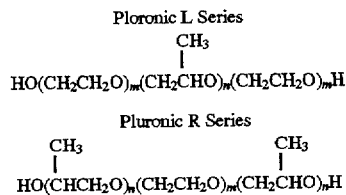

Pluronic R Series

The tetrafunctional compounds below are available under the 'Tetronic' trade name.

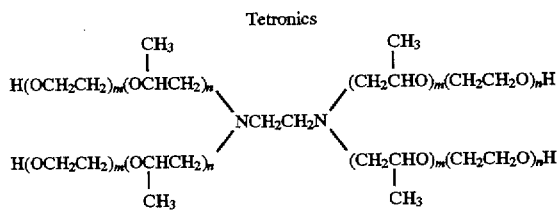

Tetronics

-continued
Tetronic R Series

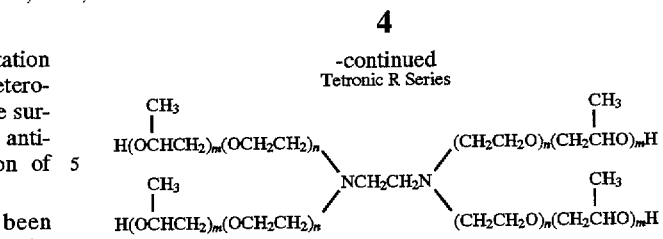

The PPO based surfactants are available with PPO as the end group functionality or with the PEO as the end group functionality. Surfactants with PPO as the end group functionality are generally preferred. In this case, the $CO_2$-philic portion (PPO) is located at the molecule end groups and increases the accessability for $CO_2$ interactions. The $CO_2$-phobic portion (PEO) is preferred to exist within the center of the surfactant molecule and therefore interacts as a group for $CO_2$-phobic substances. The values of m typically range from 2 to 400 for the Pluronics and from 20 to 1,000 for the Tetronics. The values of n typically range from 10 to 100 for the Pluronics and from 20 to 200 for the Tetronics. These values may be adjusted to control the amount of $CO_2$ philic/phobic character. Similar copolymers exist for PBO/PEO compositions.

Another example of suitable PPO based surfactants are the amine functional 'Jeffamines' available from Huntsman Chemical Co. Jeffamines are PEO-PPO copolymers with a monofunctional amine end group. In these compounds the $CO_2$ can react with the amines to form carbamic acids. The ionic head groups thus formed in-situ when the surfactant is added to the $CO_2$ now form the '$CO_2$-phobic' portion of the surfactant. The PPO backbone forms the $CO_2$-philic portion.

The surfactant is generally present in the heterogeneous $CO_2$ mixture between 0.01 and 30 percent by weight to polymer. Preferably, the range is 0.25–5.

This invention is related to the specific $CO_2$-philic nature of the PPO or PBO chemical groups. FIG. 1 describes the solubilities of a variety of PPO and PEO oligomers. This Figure indicates the pressures required for a particular weight percent of oligomer to become soluble in $CO_2$. The pressures required to attain 1% by weight of PEO in $CO_2$ are much higher than those used to obtain the same weight percent loading for the PPO compounds. This demonstrates the higher $CO_2$-philic character of the PPO chemistry compared to the PEO compounds. Also, the PPO based compounds are soluble to much higher concentrations at lower pressures and temperatures than the PEO compounds The procedures utilized to prepare a stable heterogeneous mixture described by this invention are either by 'micronizing' an existing polymer in $CO_2$ or by compressed fluid antisolvent techniques.

EXPERIMENTAL

The present invention is explained in greater detail in the following examples. As used herein Mw means weight average molecular weight; 'g' means grams, mL means milliliters, 'C' means degrees celsius, 'S' means seconds, 'h' means hours, 'psig' means pounds per square inch (gauge). These examples are illustrative and are not to be taken as limiting of the invention.

EXAMPLE 1

Figure 2:
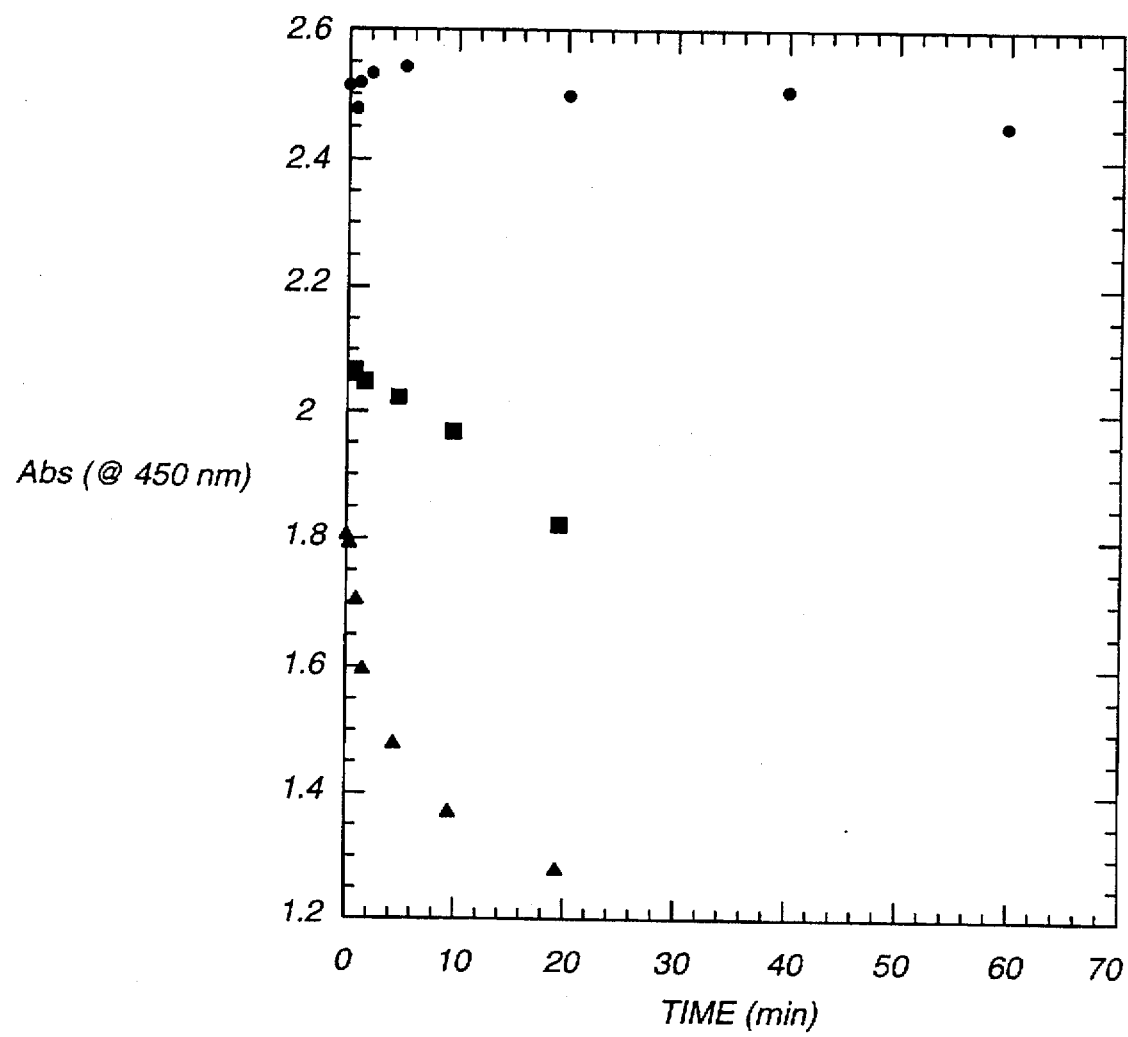
FIG. 2 is a plot showing the emulsion stability of an emulsified sample of poly(2-ethyl hexyl acrylate) at 40° C. a) without surfactant, b) with a propylene oxide based surfactant, c) with poly(fluoro octyl acrylate) surfactant.
Figure 3:
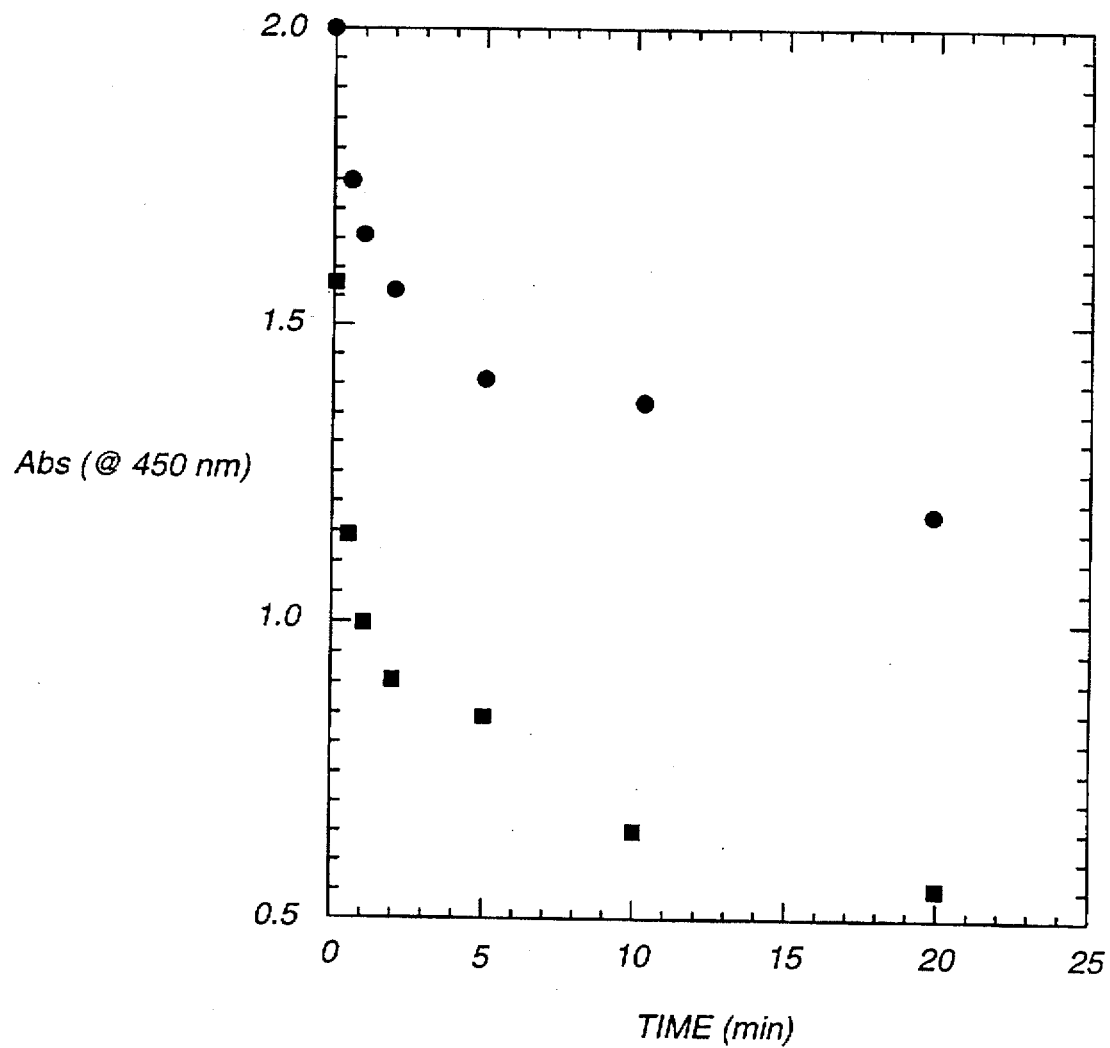
FIG. 3 is a plot showing the emulsion stability of an emulsified sample of poly(2-ethyl hexyl acrylate) at 25° C. & 1500 psi a) without surfactant, and b) with a propylene oxide based surfactant.

An emulsifier was used to study the various effects of PPO based surfactants on the stability of an acrylate polymer. In this example, poly(2-ethyl hexyl acrylate) Mw=4040 g/mole was used. The polymer (0.4 to 5 g) was charged to a "mother cell" and 12 cc's of $CO_2$ added. After allowing to come to thermal equilibrium the CO2/polymer mixture was pumped through the entire system to 'micronize' the sample. This emulsified the polymer. When the pumping was stopped, this in turn 'trapped' a small amount of the poly(2-ethyl hexyl acrylate) emulsion in the 'daughter' cell. The stability of this control sample was monitored using light scattering, a wavelength of 450 nm was used. FIG. 2 describes the emulsion stability for this poly(2-ethyl-hexyl acrylate) control. The absorbance drops as the polymer agglomerates together and more light passes through the sample. The experiment was repeated with the PPO based surfactant Pluronic/17R2 (0.01 to 0.03 g) added to the poly(2-ethyl hexyl acrylate) (0.4 to 0.5 g). Higher absorbance for the same time period describes an emulsion with improved stability. Also included in FIG. 2 are the results for using poly(fluoro octyl acrylate), ie poly(FOA), a surfactant example from the prior art. The fluorinated acrylate, poly (FOA), was observed to give high emulsion stability for long periods of time, under these temperature conditions of 40° C.

EXAMPLE 2

The same emulsion stability experiment as in Example 1, was performed at lower pressures and temperatures, ie, 1500 psi at 25° C. Under these conditions the best surfactant know from prior art, poly(FOA) could not form an emulsion due to its insolubility under these conditions. However, the Pluronic/17R2 did show a significant improvement over the control at the same temperatures and pressures. Clearly a significant advantage of these lower molecular weight PPO based surfactants has been demonstrated over the existing surfactant knowledge from prior art.

EXAMPLE 3

Poly(methyl methacrylate) (PMMA) was purchased from Scientific Polymer Products Inc. ($M_w$=75,000). Spectrophotometric grade methyl ethyl ketone (MEK) (Mallinkrodt) was used as received. Pluronic 17R2 (BASF) has an EO/PO 80/20, while SAM 185 (Air Products and Chemicals, Inc.) has a BO/EO 60/40. The morphology of the PMMA was analyzed and imaged with a Jeol JSM-35C Scanning Electron Microscope (SEM). The PCA apparatus and procedure were employed, although, in this study the polymer solution is atomized through a coaxial nozzle.

To maintain a homogeneous solution, the $CO_2$ temperature and pressure were maintained at 23° C. and 138 bar for each experiment. For all experiments, a 1.0 wt % PMMA in MEK solution was sprayed at 1.0 mL/min into $CO_2$ at 35 mL/min for ~25 sec. In addition, all of the morphologies were reproduced at least once at each condition.

When PMMA microparticles were precipitated into pure $CO_2$, a highly agglomerated morphology was formed. Several visual observations were recorded during the spray process. Extensive flocculation occurred after spraying for ~10s. The PMMA accumulated on the inside wall of the precipitator ~15s into the spray.

Upon the addition of 0.053 wt %, 17F2, a PPO based surfactant, to the flowing $CO_2$ to stabilize PMMA microparticles, large differences were clearly apparent. PMMA primary particles were present in the range of 0.1 to 0.5 µm. During atomization, no particle flocculation was observed. Furthermore, no PMMA accumulation was observed on the inside wall of the precipitator.

The results of addition of 0.05 wt % SAM 185, a butylene oxide based surfactant, to the flowing $CO_2$ stabilized the PMMA into microparticles. Visual observations similar to 17R2 were recorded. Here the PMMA primary particles also range in size from 0.1 to 0.5 µm, with no flocculation and agglomeration.

Having thus described the present invention, what is now deemed appropriate for Letters Patent is set out in the following appended claims.

We claim:

1. A method for stabilizing a heterogeneous polymer mixture comprising a polymer selected from the group consisting of acrylate polymers, styrenic polymers, vinyl ester polymers, and olefin polymers olefin polymers and copolymers thereof in liquid or supercritical carbon dioxide, said method comprising adding a poly(propylene oxide) or poly(butylene oxide) based surfactant to the heterogeneous polymer mixture.

2. A method in accordance with claim 1 wherein said surfactant is a block copolymer derived from the addition of poly(propylene oxide) to ethylenediamine.

3. A method in accordance with claim 1 wherein said surfactant is a linear triblock copolymer of poly(ethylene oxide) and poly(propylene oxide).

4. A method in accordance with claim 1 wherein said surfactant is an amine functional poly(ethylene oxide)/poly (propylene oxide) linear copolymer.

5. A method in accordance with claim 1 wherein the surfactant is added in a concentration of from about 0.01 to about 30% by weight based on polymer.

6. A method in accordance with claim 1 wherein the surfactant is added in a concentration of from about 0.25 to about 5% by weight based on polymer.

7. A method in accordance with claim 1 wherein the heterogeneous polymer mixture is formed by micronizing a mixture of polymer and liquid or supercritical $CO_2$.

8. A method in accordance with claim 1 wherein the heterogeneous polymer mixture is formed by precipitation of a compressed fluid antisolvent.

9. A method in accordance with claim 1 wherein said surfactant is a polymer selected from the group consisting of

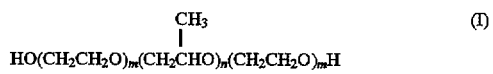

wherein n = 10–100 and m = 2–400;

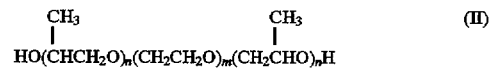

wherein n = 10–100 and m = 2–400;

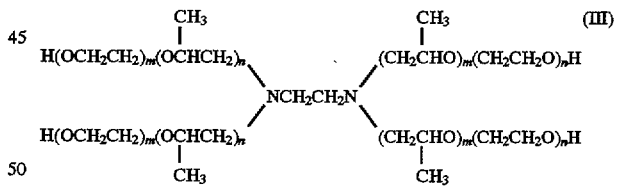

wherein n = 20–200 and m = 20–1000; and

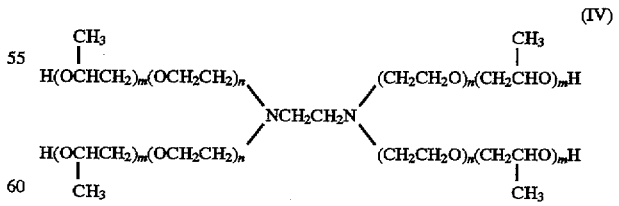

wherein n = 20–200 and m = 20–1000.

wherein n=20–200 and m=20–1000.

* * * * *